(12) United States Patent
Ajala

(10) Patent No.: US 8,412,591 B2
(45) Date of Patent: Apr. 2, 2013

(54) SYSTEMS AND METHODS FOR ONLINE MATCHING OF CONSUMERS AND RETAILERS

(75) Inventor: Dare Ajala, Hoffman Estates, IL (US)

(73) Assignee: Eczell Corporation, Hoffman Estates, IL (US)

( * ) Notice: Subject to any disclaimer, the term of this patent is extended or adjusted under 35 U.S.C. 154(b) by 138 days.

(21) Appl. No.: 13/016,123

(22) Filed: Jan. 28, 2011

(65) Prior Publication Data
US 2012/0197757 A1    Aug. 2, 2012

(51) Int. Cl.
*G06Q 30/00* (2012.01)

(52) U.S. Cl. .................. 705/26.9; 705/26.61; 705/26.62; 705/26.63

(58) Field of Classification Search ........ 705/26.1–27.2; 701/400; 715/700, 716–726, 733–747, 864
See application file for complete search history.

(56) References Cited

U.S. PATENT DOCUMENTS

| | | | |
|---|---|---|---|
| 5,852,810 A | 12/1998 | Sotiroff et al. | |
| 6,148,260 A | 11/2000 | Musk et al. | |
| 6,397,143 B1 | 5/2002 | Peschke | |
| 6,691,114 B1 | 2/2004 | Nakamura | |
| 7,007,228 B1 * | 2/2006 | Carro | 715/210 |
| 7,174,301 B2 | 2/2007 | Florance et al. | |
| 7,373,244 B2 | 5/2008 | Kreft | |
| 7,596,513 B2 | 9/2009 | Fargo | |
| 7,729,947 B1 * | 6/2010 | Philbin et al. | 705/26.9 |
| 8,145,521 B2 * | 3/2012 | Sah et al. | 705/35 |
| 8,160,929 B1 * | 4/2012 | Park et al. | 705/26.1 |
| 2003/0061211 A1 | 3/2003 | Shultz et al. | |
| 2005/0240512 A1 * | 10/2005 | Quintero et al. | 705/37 |
| 2008/0147450 A1 | 6/2008 | Mortimore | |
| 2008/0255961 A1 * | 10/2008 | Livesey | 705/27 |
| 2009/0106681 A1 | 4/2009 | Gupta et al. | |
| 2009/0112467 A1 * | 4/2009 | Jiang et al. | 701/211 |
| 2009/0116764 A1 | 5/2009 | Liu et al. | |

(Continued)

FOREIGN PATENT DOCUMENTS
KR    10-2009-0067877 A    6/2009

OTHER PUBLICATIONS
www.maps.google.com. May 14, 2009 [recovered from www.Archive.org].*

(Continued)

*Primary Examiner* — William Allen
(74) *Attorney, Agent, or Firm* — Scherrer Patent & Trademark Law, P.C.; Stephen T. Scherrer

(57) ABSTRACT

Systems and methods match buyers and sellers of goods and/or services online. More specifically, a website facilitates a search by consumers of retailers for goods and/or services. In addition, the website facilitates the advertising of goods and/or services by retailers. Specifically, a user of the system may search for particular products and services, and/or businesses. Interactive maps provide a user with location information of businesses and/or service providers that fit one or more criteria searched by the user. Icons may be generated on the map, whereupon users may obtain information relating to products or services searched for by selecting the icons. Further information may also be obtained relating to the businesses, service providers, products and/or services of the businesses and/or service providers. Users may select to buy particular products and/or services directly from the businesses and/or service providers, or may tag products and/or services for viewing at a later time. Moreover, users may correspond with others for recommending and/or reviewing particular products, services, businesses and/or service providers.

15 Claims, 5 Drawing Sheets

U.S. PATENT DOCUMENTS

| | | |
|---|---|---|
| 2009/0265251 A1 | 10/2009 | Dunlap |
| 2009/0281724 A1 | 11/2009 | Blumenberg et al. |
| 2010/0017289 A1* | 1/2010 | Sah et al. ............... 705/14.49 |
| 2010/0094548 A1 | 4/2010 | Tadman et al. |
| 2010/0145613 A1 | 6/2010 | Won et al. |
| 2010/0145800 A1 | 6/2010 | Eraker et al. |
| 2010/0257163 A1* | 10/2010 | Ohazama et al. ............ 707/724 |
| 2011/0071895 A1* | 3/2011 | Masri ..................... 705/14.27 |
| 2012/0123904 A1* | 5/2012 | Foerster .................. 705/26.62 |
| 2012/0159371 A1* | 6/2012 | Thrapp et al. ............. 715/772 |

OTHER PUBLICATIONS

International Search Report and Written Opinion of the International Searching Authority for copending Int'l App. No. PCT/US12/23046.

* cited by examiner

SYSTEMS AND METHODS FOR ONLINE MATCHING OF CONSUMERS AND RETAILERS

TECHNICAL FIELD

The present invention relates to systems and methods for matching buyers and sellers of goods and/or services online. More specifically, a website facilitates the search by consumers for businesses, such as retailers having one or a plurality of goods and/or services for sale. In addition, the website facilitates the advertising of goods and/or services by retailers to consumers and/or potential consumers.

BACKGROUND

It is, of course, generally known to use the internet for buying and selling goods and/or services. Specifically, since the time of interconnected computers, means developed quickly to facilitate commerce. As the Internet has grown and developed, a robust marketplace has appeared where buyers can find and purchase most anything that is available by sellers. Moreover, jurisdictional boundaries have diminished and, in some cases, have disappeared as purchasers have taken advantage of the Internet for purchasing goods and/or services in other states, countries and continents.

Because the Internet is so prevalent to consumers, billions of dollars have exchanged hands through buying and selling of goods via the Internet. For example, a well-known online marketplace is eBay®, an online auction site where users bid on items placed for sale by potential purchasers. Although the Internet can be useful for buying and selling items, typically individuals are not local to each other, and much time and money may be wasted having to ship items.

The Internet can also be used for obtaining information about particular sellers. For instance, a purchaser may be able to find local sellers of goods and/or services using the Internet to search for particular businesses, goods, services, or other like information. Popular search engines, such as Google™, Bing™ or other like search providers, may be utilized by a consumer for searching information relating to local sellers of goods and/or services. In general, a buyer, to be listed on an online search engine, must submit an application including very rudimentary information about the business, such as location, hours of operation, and a brief description of items and/or services sold or otherwise provided by the business. Typically, the search engines merely provide a link or links to particular businesses that match the search criteria provided by the searcher. In some limited cases, the rudimentary information may be provided to the searcher relating to the location, hours of operation, and the brief description of items and/or services sold or otherwise provided by the business. Also, search engines may be utilized to show, on a graphical map, location information, such as with a flag or other indicator; but again, the location information may not be reliable if the location of the store has changed and the location information has yet to be updated by the search engines.

The difficulty with utilizing online search engines to promote a business, product or service is that the search engines typically require forms to be filled relating to information, including whether the business must update the information relating to the business. The forms must then be received by the search engine and the information entered to effect a change on the search engine's search results. For example, if a business changes location, the business must submit the information in a form to the search engine, and the updated information may then be displayed, but typically it takes much time to effectuate the change and have the updated information be presentable to consumers.

Another popular online website useful for the buying and/or selling of goods and/or services is Craig's List, which allows buyers to post specific information about goods being sold, with, typically, information being provided relating to location, description of the goods and/or services, price, contact information and the like. Craig's List is useful for conducting searches relating to particular goods and/or services, especially by location. However, once a good and/or service is posted on Craig's List, the information is generally fixed and difficult to change. Moreover, information relating to a business is more difficult to impart to a purchaser, as goods are more often sold individually as opposed to under the umbrella of an apparent store.

In addition, the Internet has also grown to facilitate social networking properties. Websites such as Facebook™ and MySpace™ allow for the instant or nearly instantaneous connection of individuals in a social setting. For example, Facebook™ allows a user to sign in and provide information about him or herself, creating a Facebook™ page to post information. In many cases, the information may be updatable quickly by a user. For example, a user may have a page with information contained thereon, and the user may quickly update the information, or add information to the page using Facebook's editing features. Moreover, users may upload digital photographs, information, links, videos, sounds, and other like packets of information to their pages for instant access by those whom they have "friended" on the site. Facebook™ also provides the ability for users to search for one another, connecting to each other so that the users may instantly or nearly instantly inform others of particular information.

Businesses selling products and/or service providers may also use Facebook™ to advertise their goods and/or services. Thus, a business or service provider may create a page and may update information relating to particular goods and/or services. However, while Facebook™ is useful for finding a business or service provider if the name is known, it is less useful if one wishes to search for particular goods and/or services, or by location. Facebook™ merely aids purchasers in finding about businesses or service providers and staying connected to the businesses or service providers by receiving updates from the businesses or service providers. Also, in many cases, purchasers do not wish to find general information about sellers, but may be more interested in how they may be able to find the brick-and-mortar stores for in-person shopping. This may be especially true if a purchaser does not wish to waste time and money having goods shipped.

Moreover, it may be difficult to obtain information about particular businesses or service providers and the goods and/or services sold by the particular businesses in a mobile setting. In many cases, individuals may be traveling and may wish to find particular businesses or service providers that sell particular goods and/or services, but in a very specific location. Moreover, the purchaser may wish to know additional information relating to the business or service provider than is typically provided by a search engine, such as specific inventory of goods and the like, or other like information that is typically difficult to update by a business or service provider because it may change rapidly.

A purchaser may also desire to stay connected to a particular business or service provider, such as in a social networking manner. Thus, a purchaser may wish to obtain specific updates relating to the business or service provider on an immediate basis. Moreover, businesses or service providers may wish to have a venue to provide instantaneous or nearly instantaneous updates to its consumer base, such as information relating to inventory of goods or other like information that may drive potential purchasers to the businesses.

Moreover, it is typically difficult for an online purchaser of goods and/or services to track products and/or services that may be offered by businesses or service providers. For example, when a purchaser typically utilizes the internet, such as a search engine, to search for products, in many cases it is difficult to compare goods and/or services together, or to save information about a product or service across businesses or service providers.

A need, therefore, exists for improved systems and methods for matching buyers of goods and/or services with sellers and/or service providers. Specifically, a need exists for improved systems and methods that allow buyers of goods and/or services to better search for businesses having goods and/or services desired by the buyers.

Moreover, a need exists for improved systems and methods for allowing buyers to search for particular goods and/or services that may be sold by a plurality of localized businesses so that the buyer may facilitate the purchase of the goods and/or services easily and expeditiously.

In addition, a need exists for improved systems and methods for allowing businesses to better advertise their goods and/or services to potential buyers. Specifically, a need exists for improved systems and methods for allowing businesses to quickly and easily update information relating to goods and/or services online so that potential buyers may instantly or nearly instantly be made aware of the updated information.

A need further exists for improved systems and methods for buyers to search for localized businesses, such as businesses in particular geographical regions that may be defined by the buyers in order to find local businesses having brick-and-mortar stores for the purchase of the goods and/or services.

A need further exists for improved systems and methods that may provide graphical location-specific information relating to buyers' searches. Still further, a need exists for improved systems and methods that provide instant information relating to a business while viewing the graphical location-specific information.

A need additionally exists for improved systems and methods for allowing purchasers to quickly be updated on changed information relating to one or more businesses. A need also exists for improved systems and methods for allowing businesses to obtain immediate feedback from buyers or potential buyers relating to information provided relating to the businesses.

Moreover, a need exists for improved systems and methods for allowing potential purchasers to obtain localized information relating to businesses and/or goods and/or services sold by businesses and relating to location-based information that may be provided by a mobile device that may be in a potential purchaser's possession.

Still further, a need exists for improved systems and methods for allowing potential purchasers of goods and/or services to save information about the goods and/or services for purposes of comparing goods and/or services across businesses or service providers, or to recall information about the goods or services at a later time.

SUMMARY OF THE INVENTION

The present invention relates to systems and methods for matching buyers and sellers of goods and/or services online. More specifically, a website facilitates the search by consumers of retailers for goods and/or services. In addition, the website facilitates the advertising of goods and/or services by retailers.

To this end, in an embodiment of the present invention, a method for finding a business selling a product is provided. The method comprises the steps of: providing an online system, wherein the online system includes information relating to a plurality of businesses, each of the businesses having at least one product for sale; inputting at least one search parameter into the system, wherein the at least one search parameter relates to at least one of a business, a product, or a location; receiving information on a map relating to location information of a first business matching the at least one search parameter, wherein the information on the map comprises an icon representing the first business; providing a cursor and using the cursor to select the icon representing the first business; and receiving information about the first business and the at least one product for sale by the first business.

In an embodiment, the at least one search parameter relates to a business, and further wherein the at least one search parameter includes location information about the business.

In an embodiment, the at least one search parameter relates to a product, and further the at least one search parameter includes a product name.

In an embodiment, the method further comprises the step of: inputting a plurality of search parameters into the system, wherein a first search parameter relates to a product and a second search parameter relates to location-specific information about where the product is sold.

In an embodiment, the at least one search parameter relates to a location, and further the at least one search parameter relates to a geographical range.

In an embodiment, the at least one search parameter relates to information selected from a street designation, a city designation, and a zip code designation.

In an embodiment, the method comprising the steps of using the cursor to select an icon representing the first business includes touching the icon with the cursor and further touching the icon with the cursor causes a window to be shown including the information about the first business and the at least one product for sale by the first business.

In an embodiment, the method further comprises the step of: receiving information on the map relating to location information of a plurality of businesses matching the at least one search parameter, wherein the information on the map comprises a plurality of icons, each of the plurality of icons representing one of the plurality of businesses.

In an embodiment, the at least one search parameter relates to a product, and further the information received about the first business and the product for sale by the first business includes at least one pictorial representation of the first product.

In an alternate embodiment of the present invention, a method of providing information about a product for sale by a business is provided. The method comprises the steps of: providing an online system wherein the online system includes information relating to a plurality of businesses, each of the businesses having at least one product for sale; accessing the system by a first business having a location and at least one product for sale; inputting information into the system relating to the location of the business and the at least one product for sale, wherein the system is searchable by a first user of the system and further wherein the information relating to the location of the first business is pictorially represented on the map by an icon indicating to the user the location of the first business and further wherein the user may obtain information about the business and the at least one product by selecting the icon.

In an embodiment, the information relating to the at least one product for sale is a pictorial representation of the at least one product for sale.

In an embodiment, the method further comprises the step of: inputting information into the system relating to a plurality of products for sale by the first business, wherein at least one of the plurality of products is pictorially represented to the user if the at least one of the plurality of products matches at least one search parameter input by the user.

In an embodiment, the plurality of products are pictorially represented to the user if each of the plurality of products matches the at least one search parameter input by the user.

In an embodiment, the method further comprises the step of: accessing the system and changing information relating to at least one of the location of the first business and the at least one product for sale by the first business.

In an embodiment, the method further comprises the step of: having immediately available the changed information relating to at least one of the location of the first business and the at least one product for sale by the first business for searching by the first user of the system.

In an embodiment, the method further comprises the steps of: providing an information page relating to the first business, wherein information relating to the first business and to the at least one product is displayed on the information page; and accessing the information page relating to the first business by the first user, wherein the information page relating to the first business is accessed by the first user via the information about the business and the at least one product after selecting the icon.

In an embodiment, the information about the business and the at least one product is displayed in a pop-up window after selecting the icon representing the first business on the map by the user.

In an alternate embodiment of the present invention, a system for storing information about a plurality of businesses, each of the plurality of businesses having at least one product for sale and accessible by a first user for searching the system for a first product is provided. The system comprises: a database storing information relating to the plurality of businesses and the products for sale by the businesses; a graphical representation to a first user of the system, wherein the graphical representation comprises a map, wherein the map shows at least one icon representing at least one business having at least one product for sale, wherein the system comprises searching means for the first user to search for at least one of a first product, a business, and a location, wherein the at least one icon pictorially shows a location of the at least one business, and further wherein selecting the icon using a cursor shows a pop-up window comprising further information about the at least one business and the at least one product for sale by the business.

In an embodiment, selecting the icon using the cursor comprises touching the icon with the cursor without clicking on the icon.

In an embodiment, the map shows a plurality of icons representing a plurality of businesses, each of the businesses has a plurality of products for sale, and further each of the plurality of icons shows a location of one of the plurality of businesses, and further the pop-up window includes information relating to a plurality of products, each of the products shown in the pop-up window satisfying search parameters input by the user.

It is, therefore, an advantage of the present invention to provide improved systems and methods for matching buyers of goods and/or services with sellers and/or service providers.

Specifically, it is an advantage of the present invention to provide improved systems and methods that allow buyers of goods and/or services to better search for businesses having goods and/or services desired by the buyers.

Moreover, it is an advantage of the present invention to provide improved systems and methods for allowing buyers to search for particular goods and/or services that may be sold by a plurality of localized businesses so that the buyer may facilitate the purchase of the goods and/or services easily and expeditiously.

In addition, it is an advantage of the present invention to provide improved systems and methods for allowing businesses to better advertise their goods and/or services to potential buyers.

Specifically, it is an advantage of the present invention to provide improved systems and methods for allowing businesses to quickly and easily update information relating to goods and/or services online so that potential buyers may instantly or nearly instantly be made aware of the updated information.

It is a further advantage of the present invention to provide improved systems and methods for buyers to search for localized businesses, such as businesses in particular geographical regions that may be defined by the buyers in order to find local businesses having brick-and-mortar stores for the purchase of the goods and/or services.

It is a further advantage of the present invention to provide improved systems and methods that provide graphical location-specific information relating to buyers' searches.

Still further, it is an advantage of the present invention to provide improved systems and methods that provide instant information relating to a business while viewing the graphical location-specific information.

Additionally, it is an advantage of the present invention to provide improved systems and methods for allowing purchasers to quickly be updated on changed information relating to one or more businesses.

It is also an advantage of the present invention to provide improved systems and methods for allowing businesses to obtain immediate feedback from buyers or potential buyers relating to information provided relating to the businesses.

Moreover, it is an advantage of the present invention to provide improved systems and methods for allowing potential purchasers to obtain localized information relating to businesses and/or goods and/or services sold by businesses and relating to location-based information that may be provided by a mobile device that may be in a potential purchaser's possession.

Still further, it is an advantage of the present invention to provide improved systems and methods for allowing potential purchasers of goods and/or services to save information about the goods and/or services for purposes of comparing goods and/or services across businesses or service providers, or to recall information about the goods or services at a later time.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to systems and methods for matching buyers and sellers of goods and/or services online. More specifically, a website facilitates the search by consumers of retailers for goods and/or services. In addition, the website facilitates the advertising of goods and/or services by retailers.

Systems and methods of the present invention allow retail businesses or service providers who have goods and/or services for sale to be connected to buyers and/or potential buyers. Generally, the retail businesses or service providers may have the ability to have direct access to information concerning the retail businesses or service providers so that the information may be current and immediately changed and accessible when necessary. Specifically, each business or service provider may have a page showing information relating to the business or service provider, whereupon the business or service provider may change, add or delete information on the page, while also uploading information relating to products or services sold by the businesses or service providers. The businesses or service providers may associate search terms with the products or services so that they may appear in searches done by consumers, as detailed below.

It should be noted that the present disclosure refers to "businesses" that may have, in general, products and/or services to sell. The term "business" should be construed to include any organization that provides a product and/or a service to a potential purchaser or user of the product. In addition, the term "product" should be construed to include not only goods, but also services. Finally, the terms "consumers", "customers", "purchasers" and/or "potential purchasers" should be construed to include any user of the system that may utilize or wish to utilize a good or service provided by any business and/or service provider.

Generally, a consumer may access the system and conduct searches for products and/or businesses. Those businesses that have registered accounts may have their goods and/or services information along with photographs and/or videos that have been uploaded, accessible by the consumer based on the search. Location-specific information may be provided to consumers relating to the location of brick-and-mortar businesses and may be displayed graphically. Icons denoting locations of businesses found in a search by a consumer may be displayed on an interactive map, and the consumer may preview products and/or services sold by the businesses directly on the map. The consumer may then link to a particular business' page for further information, such as contact information, price information, other products and/or services sold by the businesses, or any other like information.

Figure 1:
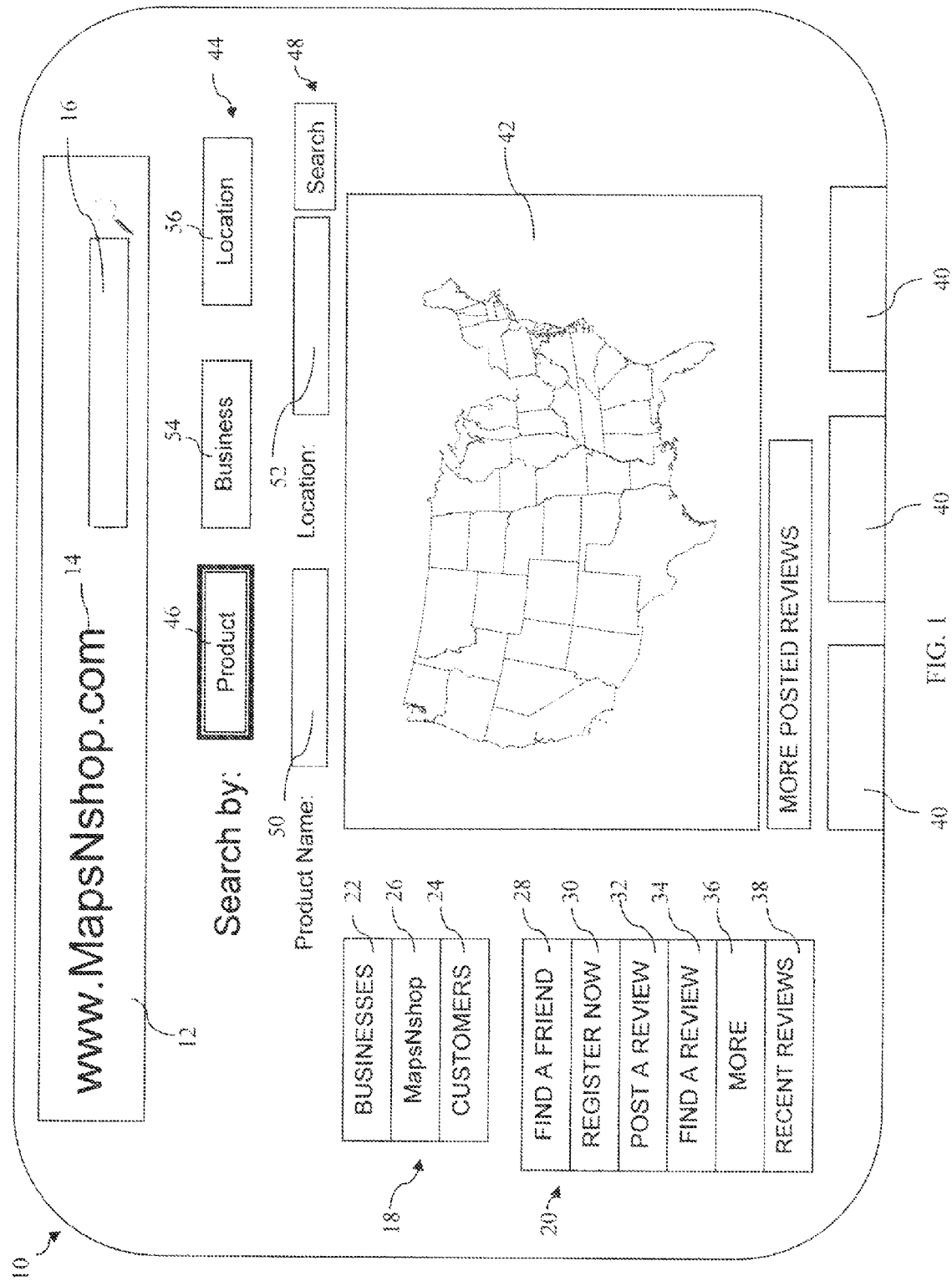
FIG. 1 illustrates a screenshot of a web-based system showing searching by product in an embodiment of the present invention.

Referring now to the figures, where like numerals refer to like parts, FIG. 1 illustrates a screenshot 10 of the system in an embodiment of the present invention. The screenshot 10 may include a plurality of fields of information useful for both businesses and consumers. For example, a banner 12 may display website related information, such as the domain name 14 as well a search field 16 for searching the system for particular information. Disposed on a left side of the screenshot 10 may be a plurality of fields helpful to a business and/or a consumer in navigating the system of the present invention. A first group of links 18 may be provided for utilizing main features of the site by businesses and/or consumers. Moreover, a second group of links 20 may be provided that may offer enhanced options for businesses and/or consumers, as described in more detail below.

Referring to the first group of links 18, a "BUSINESSES" link 22 may allow businesses to access the system. Specifically, if a business is already a member of the system or if a business wishes to become a member of the system, a user would click the "BUSINESSES" link 22 whereupon the user would be provided with a plurality of options, including a "Register" option and a "Login" option. If the business clicks the "Register" option, then the business would access a register screen having a plurality of fields for inputting information for purposes of registering for the system as well as providing information that may be displayed to consumers upon searching therefor. Alternatively, if a business clicks the "Login" option, then the business would access a login screen whereupon the business would input login information, such as a username and password. Upon entering the username and security credentials, the user would be granted access to the business' page or plurality of pages, where the business would be able to update information, upload photographs of products, tag photographs of products, upload videos about the business and/or about products, or other like ability.

Referring again to FIG. 1, a "CUSTOMERS" link 24 may be provided that may allow customers to gain access to the system. Specifically, if a customer is already a member of the system or if a customer wishes to become a member of the system, the customer could click the "CUSTOMERS" link 24 whereupon the customer would be provided a plurality of options, including a "Register" option and a "Login" option. If the customer clicks the "Register" option, the customer would access a register screen having a plurality of fields for inputting information relating to the customer, such as, for example, name, location information, preferences, photographs, videos and other like information. Alternatively, if a customer clicks the "Login" option, then the customer would access a login screen whereupon the business would input login information, such as a username and password. Upon entering the username and security credentials, the customer would be granted access to a customer page or plurality of pages, where the customer would be able to update their personal information, input personal preferences, upload photographs and videos, and provide any other information.

Referring again to the first group of links 18, a "MapsNshop" link 26 may be provided. The "MapsNshop" link 26 may allow a consumer to be granted access to the search features of the system, as described in more detail below.

Other options may be contained in the second group of links 20. For example, a user of the system may click a "FIND A FRIEND" link 28 to search the system for information about another user on the system. A "REGISTER NOW" link 30 may be provided, granting immediate access to a customer and/or a business for accessing the registration fields from any page on the system. A "POST A REVIEW" link 32 may be provided for allowing a user of the system to input information about products, services and/or businesses on the site. A "FIND A REVIEW" link 34 may be provided for a user to search the already input reviews for information about particular products, services and/or businesses on the site. A "MORE" link 36 may be provided for granting a user additional options for using the system, such as access to their account, a link to bring the user back to the home page, a "Contact Us" link for contacting the administrators of the account, or a "Categories" link for reviewing categorical information stored in the system, or in one or more databases associated with the system, such as information about consumers, businesses, products, locations, and any other like information that may be stored by the system. A "RECENT REVIEWS" link 38 may be provided allowing a user to gain access to information on products, services and/or businesses that have recently been added by users of the system, based on predefined time preferences.

Disposed on a bottom of the screenshot 10 may be a plurality of posted reviews 40 that may be accessed by users of the system. Specifically, reviews that may be highlighted by some predefined criteria may appear to alert users of the system to specific products, services and/or businesses. Information may be provided in the plurality of posted reviews 40, such as information about a product, service or business, one or more photographs, critical review information and the like. Moreover, many more reviews may be provided, and the webpage showing the reviews may have a scroll bar for scrolling to access the additional reviews.

In a preferred embodiment of the present invention, a map field 42 may be provided, as shown in screenshot 10. The map field 42 may show an interactive map whereupon specific business information may be displayed thereon, as detailed below. A group of search links 44 may be provided above the map field 42 for searching for particular products, businesses and/or locations. Specifically, the group of search links 44 may include, preferably, a "Product" link 46. Clicking on the "Product" link 46 may show a group of subsearch fields 48, including a "Product Name" field 50 and a "Location" field 52, as shown in FIG. 1. Thus, a user of the system described herein may search for particular products in a particular location, defined by the user. Results of a particular product search and location search are shown with reference to FIGS. 4 and 5, below. A user of the system described herein may find it particularly useful to search the database of the system for particular products, thereby determining location information of businesses that may sell the particular products searched for by the user.

Alternatively, the screenshot 10 illustrates that a user may be provided with other links in the group of search links 44 may include a "Business" link 54 and a "Location" link 56. Of course, any other search links may be provided for searching particular goods, services and/or businesses as apparent to one of ordinary skill in the art.

Figure 2:
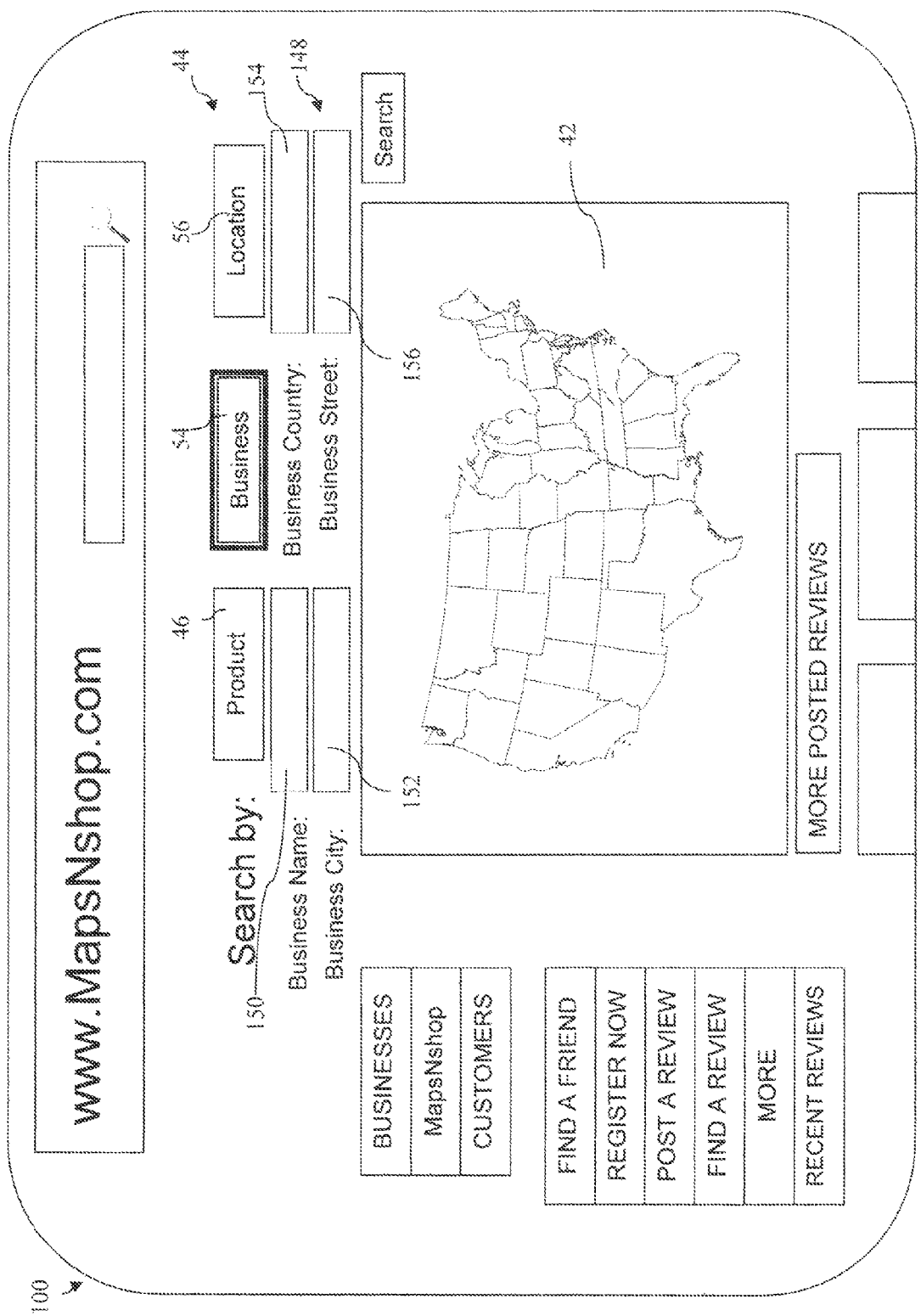
FIG. 2 illustrates a screenshot of a web-based system showing searching by business in an embodiment of the present invention.

Referring now to FIG. 2, a screenshot 100 is illustrated. The screenshot 100 may be generally identical to the screenshot 10, as shown with respect to FIG. 1, except that the screenshot 100 shows a group of subsearch fields 148 that may be provided when the "Business" link 54 is clicked within the group of search links 44. By clicking on the "Business" link 54, the group of subsearch fields 148 may offer particular subsearch fields as follows: a "Business Name" field 150, a "Business City" field 152, a "Business Country" field 154 and a "Business Street" field 156. Any or all of these fields may be utilized to locate a particular business in a particular location. Once a business is found that matches the search criterion or criteria entered into one or a plurality of the group of subsearch fields 148, the business location may be highlighted on the map 42. For example, the map may show a close-up graphical representation of a geographical region where the business is located, with an icon, such as a "pin" icon (not shown in FIG. 1, 2 or 3) showing the location of the business. Other features associated with the pin icon may be provided, as generally disclosed below with reference to FIGS. 4-5. Additionally, if a plurality of businesses is found that match the search criteria based on location, then a plurality of pin icons may be placed on the map, with the map showing the geographical region and the plurality of pin icons.

Figure 3:
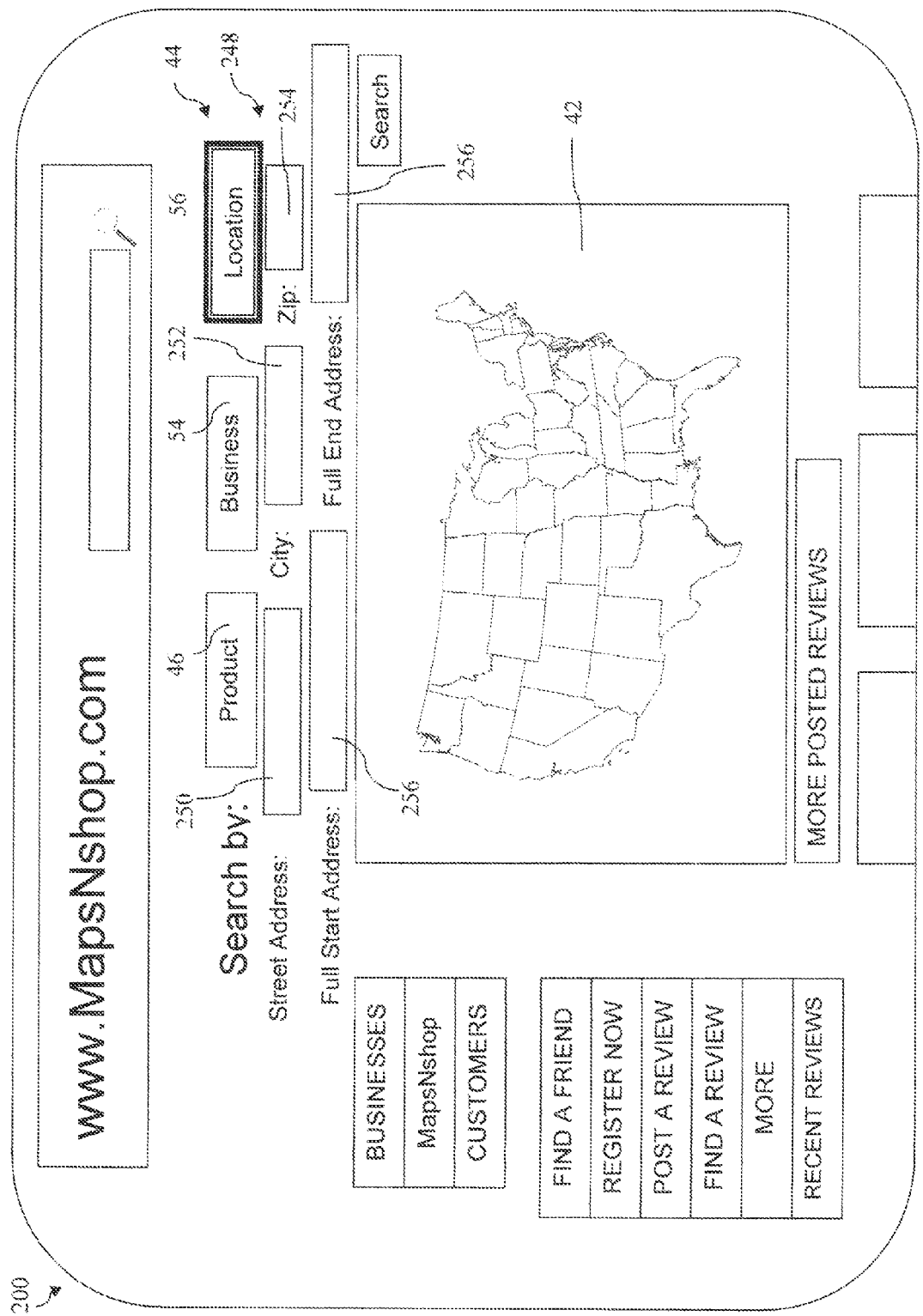
FIG. 3 illustrates a screenshot of a web-based system showing searching by location in an embodiment of the present invention.

Referring now to FIG. 3, an alternate embodiment of a screenshot 200 is illustrated. The screenshot 200 may be generally identical to the screenshots 10 and 100, as shown with respect to FIGS. 1 and 2, except that the screenshot 200 shows a group of subsearch fields 248 that may be provided when the "Location" link 54 is clicked within the group of search links 44. By clicking the "Location" link 56, the plurality of subsearch fields 248 may provide options for allowing a user to search for all businesses at a particular location, or within a specified range. For example, a "Street Address" field 250 may be utilized for specifying, generally, a particular street, or on or near a particular location on a street. A "City" field 252 may be provided for inputting information about a particular city. A "Zip" field may also be utilized for inputting zip code information for searching for businesses that fall within the particular zip code. Alternatively, other information such as a location range may be specified by inputting information about a "Full Start Address" field 256 and a "Full End Address" field 258. Thus, all businesses registered with the system falling within the specified range may be highlighted on the map 42, shown using pin icons or any other symbol that demonstrates businesses found in the search. This may be useful if a consumer is visiting a particular geographic region, such as a city, and may wish to know of all retail businesses that fall within the particular geographic region. A consumer may search for the businesses, and may compare the businesses and their particular products prior to attempting to find the businesses physically.

Figure 4:
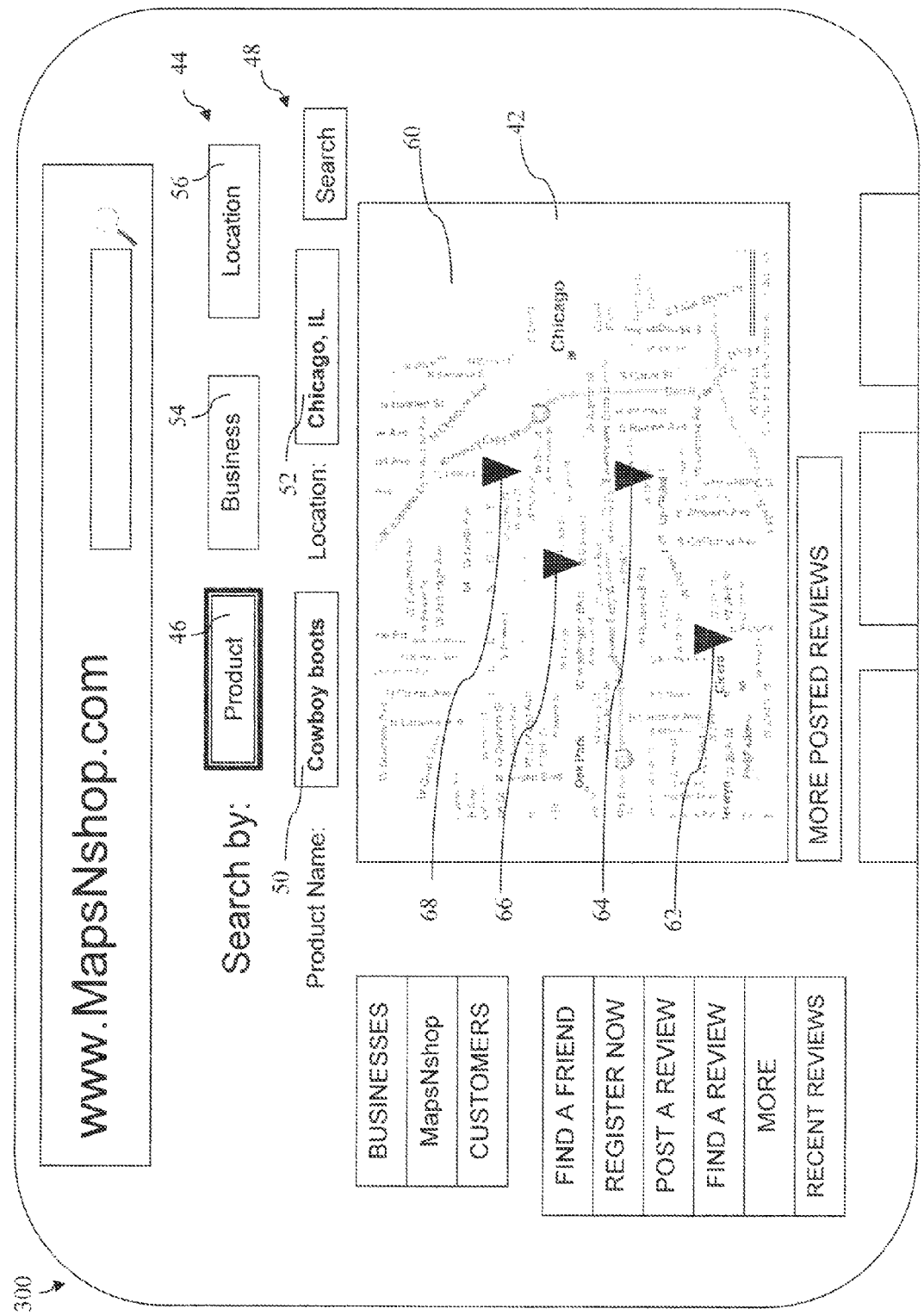
FIG. 4 illustrates a screenshot of a web-based system showing search results in an embodiment of the present invention.

Now referring to FIG. 4, a screenshot 300 is illustrated showing an example of a search conducted on screenshot 10, as described above with reference to FIG. 1. Specifically, screenshot 300 illustrates the "Product" link 46 having been clicked by a user, and the "Product Name" field 50 and "Location" field 52 filled with the information "Cowboy boots" and "Chicago, Ill.", respectively. Upon conducting the search, the map field 42 may show an interactive map 60 having a plurality of pin icons 62, 64, 66, 68, for example. In this non-limiting example, four businesses that offer cowboy boots were identified by the search. The pin icons 62, 64, 66, 68 demonstrate precise locations on the interactive map 60 so that a user can physically determine the locations of these businesses. Specific information about the business, as detailed below, may be shown on the screen when the user's cursor scrolls over any pin icon 62, 64, 66, 68.

It should be noted that the map field 42 may show an interactive map having location features that are typically found in maps provided by search providers, such as, for example, BING™ and GOOGLE™. Specific features offered by the maps may be incorporated into the system and may be taken advantage of by the system and/or by users of the system.

Figure 5:
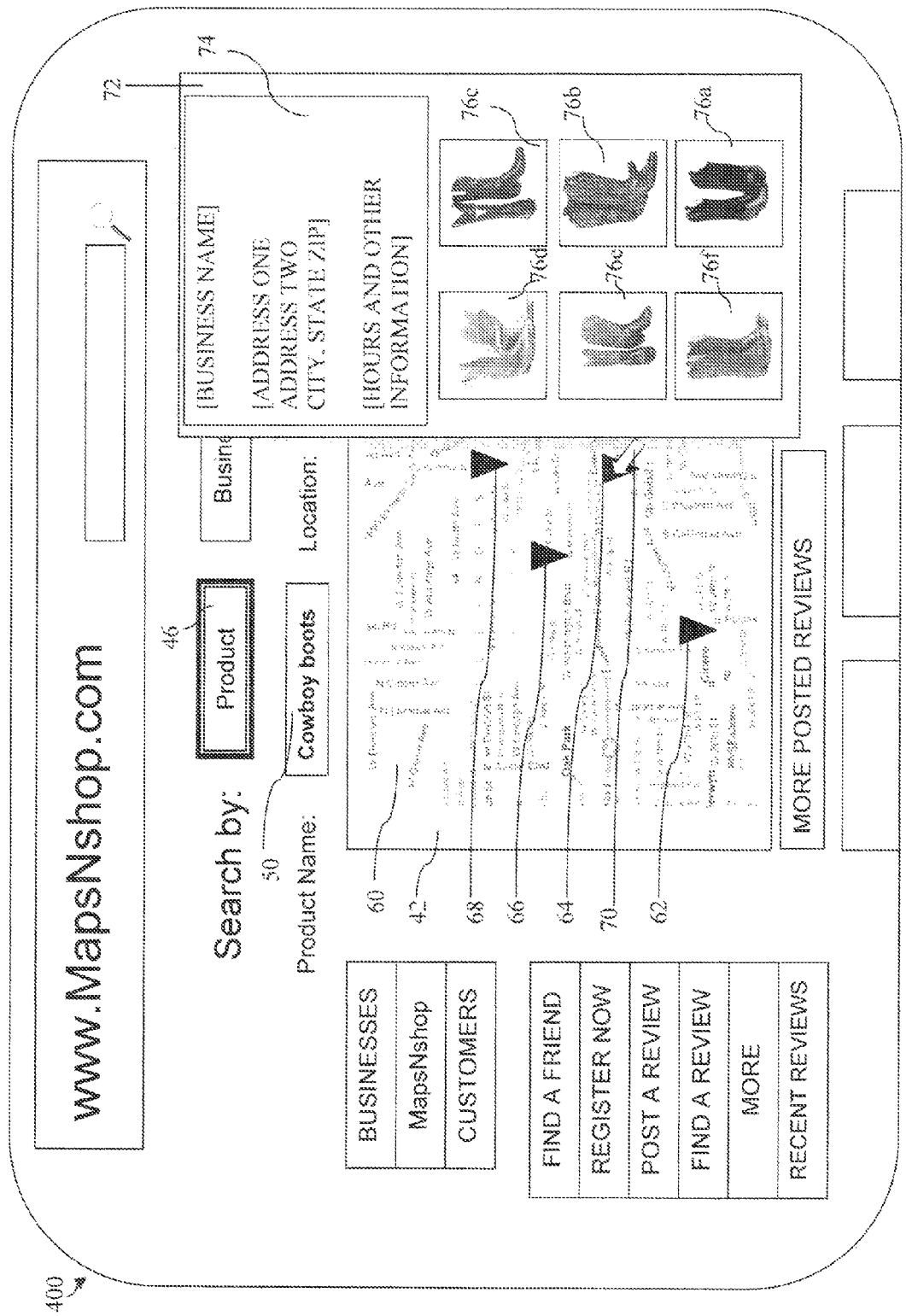
FIG. 5 illustrates a screenshot of a web-based system showing retail store information and inventory samples in an embodiment of the present invention.

Referring now to FIG. 5, a screenshot 400 is illustrated showing a cursor 70 as it scrolls over pin icon 64. A pop-up box 72 may be shown having detailed information about the business represented by the pin icon 64, as well as particular products, preferably the products searched in the "Product Name" field 50. Specifically, the pop-up box 72 may appear as soon as the cursor 70 scrolls over the pin icon 64 or otherwise virtually touches the icon. Of course, other pop-up boxes with specific information relating to the businesses represented by the other pin icons 62, 66 and 68 may be provided if those pin icons are scrolled over with the user's cursor 70. Other ways of selecting the pin icons for display of the pop-up windows showing further information about the businesses may be utilized, and may involve clicking on the particular pin icons, for example, and the invention should not be limited to requiring merely touching the pin icon or scrolling over the pin icon with the cursor, as described herein.

The pop-up box 72 may include an information box 74 having detailed information about the business, including the business name, the address, the hours and/or any other information that the business may wish to give to customers. For example, the detailed information about the businesses presented in the pop-up box may also include photographs showing the business and/or videos imparting information about the business (such as introductory information or other like information) or products sold by the business. In addition, a plurality of product displays 76a, 76b, 76c, 76d, 76e and 76f may be shown displaying information about the products, preferably, photographs and/or videos of the particular products searched for by the user. Alternatively, the business may provide any other information within the pop-up box, including photographs of other products that may not have been specifically searched for by the user. In addition, more than the six product displays 76a-76f may be displayed, and a scroll bar (not shown) may be utilized in the pop-up box 70 to display this additional information.

Moreover, the pop-up box 72 may be shown until the user moves the cursor 70 off of the particular pin icon representative of the business. Alternatively, the pop-up box 72 may remain on the screen until the box is closed by the user by clicking on a "close" button, such as an "X" button or the like that may be provided, for example, in the upper corner of the pop-up box 72.

Of course, searching the system by business and/or location (by clicking search links 54 and 56, respectively) may provide information relating to one or more businesses in a similar manner as described with respect to FIGS. 4 and 5. The map field 42, in each of these cases, may display the location information about the one or more businesses, and pin icons (or another symbol apparent to one of ordinary skill in the art) may represent these businesses, and the information provided by the business on the pop-up box may be tailored depending on the search, or as defined by the businesses.

Specifically, a business may have the option of designating particular information to be seen by a user when the pop-up box 72 is displayed after scrolling over the pin icon. The business may have the ability to update information at any time upon logging into the website, such that the business may provide immediate updating of information when desired. Thus, once a business accesses the system and inputs, deletes or otherwise changes information, the information may be instantly or nearly instantly obtainable by consumers.

Once a business may be identified by a consumer, the consumer may engage the business by, for example, clicking on the pop-up box 72, on a link that may be contained within the pop-up box, on the pin icon representing the business on the interactive map 60, or in any other way apparent to one of ordinary skill in the art. Moreover, the product displays 76a-76f shown in the pop-up box may have associated links such that clicking on each product display 76a-76f, or any other pictorial representation, may allow a consumer to link either to the business page, or another page that has specific information relating to the particular product selected.

The business page may include any information that the business wishes to impart to a consumer or other user of the system. Specifically, photographs and videos, or any other information, may be displayed on a business page, and may be tailored by the business at any time. For example, a business page may include introductory information about the business for a consumer to view.

In addition, consumers may wish to receive updated information relating to the businesses and, thus, may request information to be automatically received by the consumers when updated by the businesses. Alternatively, businesses may wish to receive automatic information about other businesses and/or other consumers, so may require information to be automatically received by the businesses when updated by other businesses or by consumers. Thus, consumers and/or businesses may maintain closer connections with each other.

Consumers, once identifying particular products that they may be interested in, may tag products sold by businesses on the system for review at a later time. For example, each consumer utilizing the system may have his or her own consumer page, which may include information about the consumer, and may also include fields for displaying products tagged by the consumer that the consumer may wish to track and/or view at a later date. For example, if a consumer wishes to discover information relating to a particular product in a certain geographical region, such as a city or the like, and several businesses show the same or similar products, the consumer may tag the particular product or products of one or more of the businesses for further review at a later date. In addition, the consumer may generically tag a particular product, and the fields on his or her consumer page may fill in with information on the particular product or products from a plurality of businesses so that immediate comparison shopping may be done by the consumer. Of course, the system may provide this information to a consumer in any manner apparent to one having ordinary skill in the art. Although the present invention is described as filling and present information about particular products that may have been tagged on the consumer's page, the information may be compiled in other locations, such as in pop-up boxes, or other like pages that may be accessible by consumers.

The products that may be tagged by consumers for tracking and/or viewing at later times may also be updatable by businesses. For example, a consumer may have a page showing tagged products for viewing at a later time. Businesses may provide updates to the particular products, and the updates regarding the particular products may be automatically and immediately updated on the consumer's page for viewing. Specifically, if a business updates that a particular product is no longer in stock, or otherwise no longer offered by the business, then the business may update the information relating to the particular product, and that update may be viewable by the consumer on his or her page showing the tagged product.

Moreover, consumers may provide information to others regarding particular products or businesses found in searches to others that may be "connected" to the consumers. For example, a first consumer may request to receive updates regarding a second consumer. Thus, when the second consumer conducts a search, or finds information that may be posted to the second consumer's page, the first consumer may receive an update regarding the search results or other information from the second consumer. Therefore, the first consumer may receive immediate information relating to what the second consumer is searching for and finding on the system. Alternatively, a consumer may send messages to other users of the system, whether consumers or businesses, and may provide any information within the messages. For example, a consumer may send a single message or broadcast a review of a particular business and/or product found on the site to a plurality of users, the identities of which may be defined by the consumer and/or by other users.

As noted earlier, reviews may be posted on various pages of the system by users of the system to aid consumers and/or businesses track how consumers view particular businesses or products. The reviews may be provided directly and confidentiality to particular businesses and/or may be shown to particular or all users of the system. As shown in FIG. 1, reviews may be posted and users may see reviews posted, as shown in screenshot 10.

Once a product is found that a consumer may be interested in purchasing, the consumer may be presented with an opportunity to buy the product directly from the business through the system. Thus, the system may allow consumers to forego traveling to the physical locations of the businesses to purchase products offered by the businesses. Any e-commerce system may be utilized to conduct the purchases of products between businesses and consumers as may be apparent to one having ordinary skill in the art.

In practice, the present system is implemented on a computing device and may be accessible by the users (such as the consumers and the businesses), as well as by administrators and anyone else requiring access thereto, via a website portal. Specifically, the system may allow a user to access the system by presenting username and security credentials to a website that may be coded in any manner apparent to one having ordinary skill in the art. A common language for a website is hypertext markup language (html), which may be utilized to implement the website, although the website may be written in any language apparent to one of ordinary skill in the art.

Moreover, the system may be accessible by a user via a computing device, such as a desktop computer, a laptop computer, or any other computing device allowing accessibility via the Internet. In addition, the system may be accessible via a mobile device, such as an iPhone, any other mobile telephone, an iPad, any other tablet device, via a portable computer, or in any other manner apparent to one having ordinary skill in the art.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A method for finding a business selling a product, the method comprising the steps of:
providing an online system, wherein the online system includes information relating to a plurality of businesses, each of the businesses having at least one product for sale;
inputting at least one search parameter into the system, wherein the at least one search parameter relates to at least one of a business, a product, or a location;
using the online system to retrieve information of at least one business, product, or location matching the at least one search parameter;
displaying a map on a graphical display apparatus, the map graphically displaying geographical location information;
displaying location information of a first business on the map matching the at least one search parameter, wherein the information on the map comprises an icon representing the first business;
providing a graphical cursor on the map and using the cursor via a cursor controlling apparatus to select the icon representing the first business;
displaying information about the first business and the at least one product for sale by the first business in a visual window overlaid on the map, wherein the information includes visual representations of the at least one product for sale by the first business;
providing a webpage dedicated to a first user;
tagging at least one product for sale, wherein the at least one product for sale is linked to the webpage dedicated to the first user; and
linking the first user's webpage to a second user's webpage, wherein the second user receives information about the tagged products and searches of the first user.

2. The method of claim 1 wherein the at least one search parameter relates to a business, and further wherein the at least one search parameter includes location information about the business.

3. The method of claim 1 wherein the at least one search parameter relates to a product, and further wherein the at least one search parameter includes a product name.

4. The method of claim 1 further comprising the step of:
inputting a plurality of search parameters into the system, wherein a first search parameter relates to a product and a second search parameter relates to location-specific information about where the product is sold.

5. The method of claim 1 wherein the at least one search parameter relates to a location, and further wherein the at least one search parameter relates to a geographical range.

6. The method of claim 5 wherein the at least one search parameter relates to information selected from a street designation, a city designation, and a zip code designation.

7. The method of claim 1 wherein using the cursor to select an icon representing the first business includes touching the icon with the cursor and further wherein touching the icon with the cursor causes a window to be shown including the information about the first business and the at least one product for sale by the first business.

8. The method of claim 1 further comprising the step of:
receiving information on the map relating to location information of a plurality of businesses matching the at least one search parameter, wherein the information on the map comprises a plurality of icons, each of the plurality of icons representing one of the plurality of businesses.

9. The method of claim 1 further wherein the at least one search parameter relates to at least one product, and further wherein the information received about the first business and the at least one product for sale by the first business includes at least one pictorial representation of the at least one product.

10. The method of claim 1 further comprising the steps of:
providing an inter-user messaging system within the online system; and
sending an information message from a first user to a second user.

11. The method of claim 1 further comprising the step of:
posting a review in the online system, wherein the posted review is displayed to at least one user of the online system.

12. The method of claim 1 further comprising the step of:
purchasing the at least one product for sale by the first business through the online system, wherein the user does not have to travel to the physical or virtual location of the first business in order to purchase products offered by the first business.

13. A system for retrieving and storing information about a plurality of businesses, each of the plurality of businesses having at least one product for sale and accessible by a first user for searching the system for a first product, the system comprising:

a database storing information relating to the plurality of businesses and the products for sale by the businesses;

an interface configured to present a graphical representation to the first user of the system, wherein the graphical representation comprises a map displayed on a graphical display apparatus, wherein the map shows geographical location information of at least one icon representing at least one business having at least one product for sale, wherein the system comprises searching means for the first user to search for at least one of a first product, a business, and a location, wherein the at least one icon pictorially shows a location of the at least one business;

a graphical cursor on the map, wherein the user moves the cursor via a cursor controlling apparatus to select an icon, wherein a visual window is overlaid on the map comprising further information about the at least one business and the at least one product for sale by the business, wherein the further information includes visual representations of the at least one product for sale by the business;

a first webpage dedicated to the first user, wherein the at least one product for sale is linked to the first webpage dedicated to the first user; and a second webpage dedicated to a second user, wherein the first webpage is linked to the second webpage, and further wherein the second user receives information about the linked products and searches of the first user.

14. The system of claim 13 wherein selecting the icon using the cursor comprises touching the icon with the cursor without clicking on the icon.

15. The system of claim 13 wherein the map shows a plurality of icons representing a plurality of businesses, wherein each of the businesses has a plurality of products for sale, and further wherein each of the plurality of icons shows a location of one of the plurality of businesses, and further wherein the pop-up window includes information relating to a plurality of products, each of the products shown in the pop-up window satisfying search parameters input by the user.

* * * * *